United States Patent [19]

Maxfield et al.

[11] 3,749,491
[45] July 31, 1973

[54] MICROFICHE DUPLICATOR

[75] Inventors: Frank L. Maxfield, La Mesa; Roger B. Trimble, San Diego, both of Calif.

[73] Assignee: Stromberg Datagraphix Inc., San Diego, Calif.

[22] Filed: Feb. 7, 1972

[21] Appl. No.: 224,100

[52] U.S. Cl. ............. 355/106, 355/104, 355/108, 355/110
[51] Int. Cl. ........................................ G03b 27/30
[58] Field of Search ............... 355/104, 106, 108, 355/110, 111, 100

[56] References Cited
UNITED STATES PATENTS

| 1,951,952 | 3/1934 | Sullivan | 355/110 |
|---|---|---|---|
| 2,548,936 | 4/1951 | Blick | 355/110 |
| 2,641,980 | 6/1953 | Brunk | 355/106 |
| 2,983,210 | 5/1961 | Baril, Jr. et al. | 355/106 |
| 3,077,316 | 2/1963 | Wells et al. | 355/110 X |
| 3,120,793 | 2/1964 | Baglow et al. | 355/109 |
| 3,379,112 | 4/1968 | Cranskens | 355/110 |
| 3,438,706 | 4/1969 | Tanaka et al. | 355/11 |
| 3,551,049 | 12/1970 | Limberger et al. | 355/110 X |
| 3,658,418 | 4/1972 | Mastroianni et al. | 355/104 X |

FOREIGN PATENTS OR APPLICATIONS

| 915,337 | 1/1963 | Great Britain | 355/106 |
|---|---|---|---|
| 133,674 | 10/1952 | Netherlands | 355/110 |

Primary Examiner—Samuel S. Matthews
Assistant Examiner—Richard M. Sheer
Attorney—John R. Duncan

[57] ABSTRACT

A device for duplicating individual microfiche onto heat developable vesicular film is described. This device utilizes a single drive system driving a single belt to first carry the original and copy films through an exposure station and then to carry the copy film alone through a heat development station. A simple and effective adjustment system is provided to assure proper tracking and operation of the drive belt.

5 Claims, 7 Drawing Figures

MICROFICHE DUPLICATOR

BACKGROUND OF THE INVENTION

This invention relates to image duplication and, more specifically, to devices for duplicating individual microfiche images.

Recently, reduced-size copies of test material, either on roll microfilm or microfiche, have come into widespread use. Micro-images are generally produced on original silver halide film either by means of a camera photographing a printed page or photographing an image on the face of a cathode ray tube in computer output microfilming equipment.

Microfiche have come to be one of the most convenient forms for recording such information. A "microfiche" is a sheet or card of film bearing rows and columns of reduced images. Typical microfiche have dimensions of about 4 by 6 inches and are produced in sequence on a long roll of film. Where duplicates are required, the original roll is brought into contact with a roll of copy film, such as heat developable vesicular film, diazo film or silver halide film. The sequence of images is copied, and individual microfiche are cut from the roll.

Problems arise, however, where single copies are required of single microfiche after they have been cut from the roll. Most microfiche copiers require the original to be part of a long web which is threadable through a copying device. These devices generally cannot copy individual microfiche.

Copying devices for use with elongated film webs generally guide the web along a roller, belt and roller or multiple belt guide system. Often, belt tracking problems develop in the system using guide belts. Complex belt adjustment servo systems using belt edge detectors, etc., are required to obtain consistent tracking. These systems are complex and expensive and often prove unreliable.

Attempts to copy individual microfiche in manually operated contact printers such as are used in conventional photographic printing generally produce copies of poor quality. Manual printing is both slow and difficult, producing copies of irregular quality.

Thus, there is a continuing need for improved microfiche copiers capable of rapidly copying individual microfiche without the need for complex manual chemical processing steps.

SUMMARY OF THE INVENTION

It is, therefore, an object of this invention to provide a microfiche copier overcoming the above noted problems.

Another object of this invention is to provide a simple and reliable copier for individual microfiche.

Still another object of this invention is to provide an improved tracing adjustment arrangement for a film carrying belt.

The above objects, and others, are accomplished in accordance with this invention by a microfiche copier which makes copies of individual microfiche on heat developable vesicular film. A single belt is provided to carry a sandwich of original and copy film through an exposure station, returns the sandwich to the operator, then carries the copy film through a heat-development station. A simple and effective belt tracking adjustment means is provided utilizing a guide roller which is adjustable in two planes to maintain the tracking path of a wide belt constant through a system of unflanged rollers. The adjustment system also serves to tension the belt system and includes a latch means for relaxing tension during belt removal and replacement.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 1:
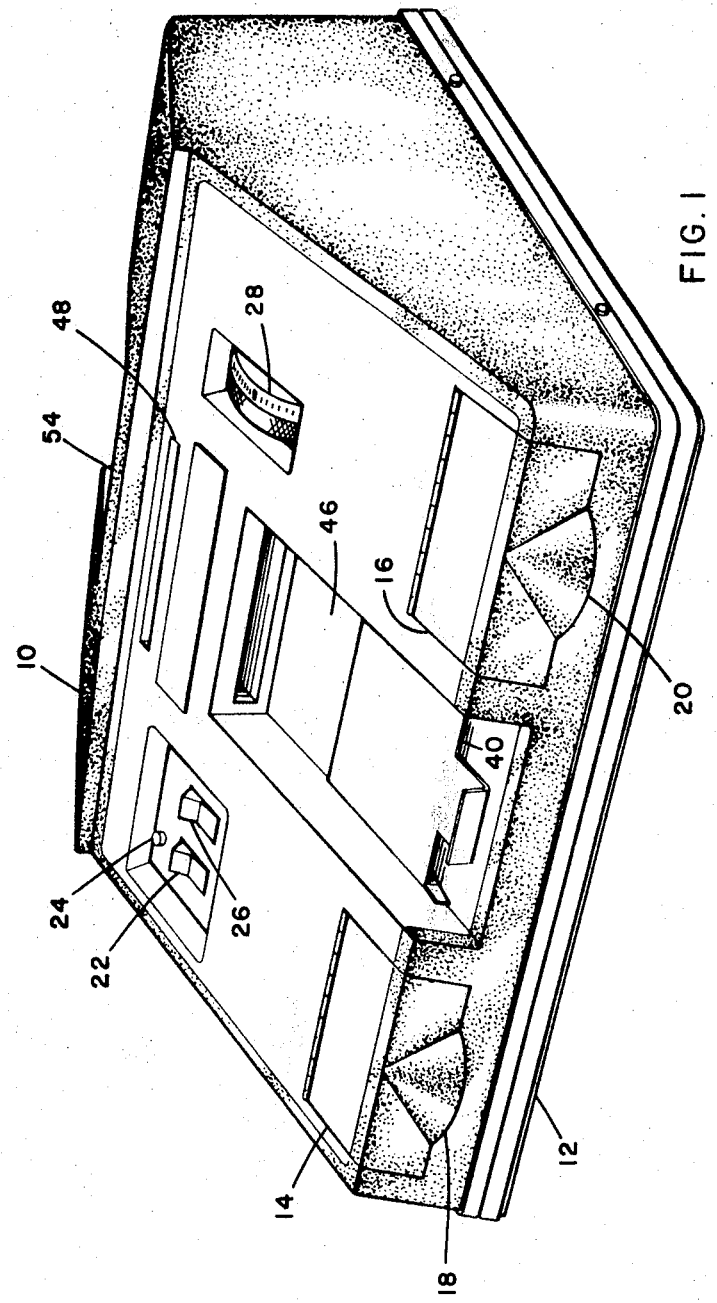
FIG. 1 is a perspective view of a microfiche duplicator according to this invention.

Referring now to FIG. 1, there is seen a microfiche duplicator enclosed within a housing or cover 10 mounted on a base 12. Two storage compartments 14 and 16 are provided in which original microfiche to be duplicated and unexposed copy film may be stored. Hinged covers 18 and 20 are provided to cover compartments 14 and 16, respectively.

A power switch 22 is provided which turns on blowers, film drive, exposure lamp, developer lamp (which are described below) and power indicator lamp 24. An operate switch 26 is provided to switch the system between the print mode where the blowers, film drive and lamps are fully operating for film duplication and a standby mode in which the exposure lamp stays on, the developer lamp stays partially on and the film drive is turned off, but the system is ready for operation without a warm-up period.

The desired exposure level is set by rotating dial 28. An initial exposure level is selected on a 1–10 scale according to the type of copy film being used. Then, exposure may be adjusted to produce optimum quality as a series of duplicates are made. Typically, exposure cylinder 44 may include a pair of shutter blades (not shown) which are movable toward and away from each other by dial 28 to vary the size of the gap therebetween through which actinic radiation passes to the copy film. Since the film moves at constant speed, total exposure is regulated by varying this gap, to vary the length of time the film is exposed.

Figure 2:
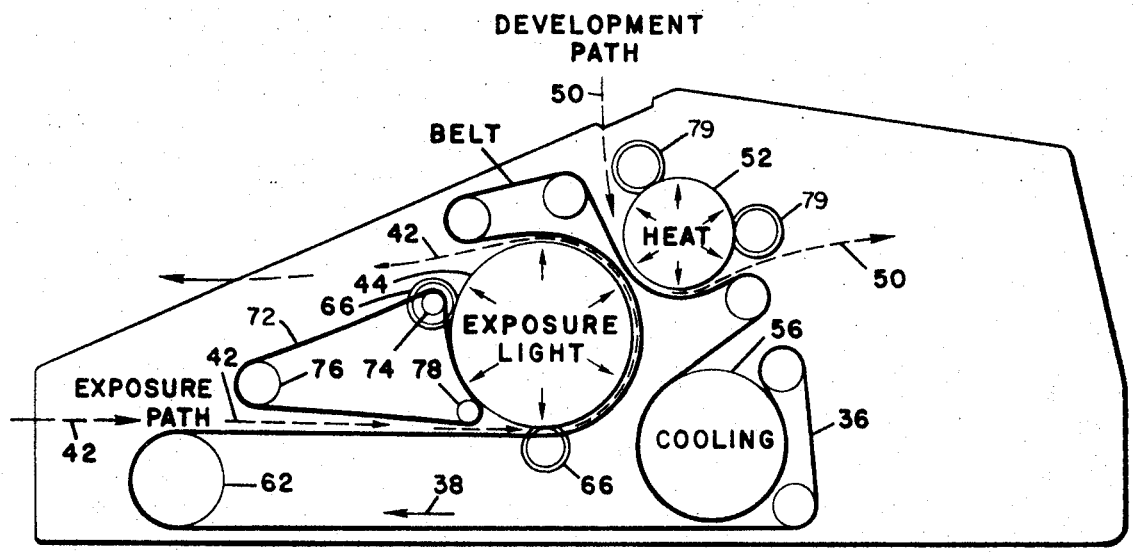
FIG. 2 is a schematic elevation view illustrating the general layout and operation of the duplicator.

As seen in FIG. 2, the operating mechanism within the duplicator basically consists of a wide, film transporting belt 36 entrained around a number of rollers. A conventional drive motor (not shown) operatively engages one of the rollers to drive belt 36 in the direction indicated by arrow 38.

In operation, an original microfiche and a sheet of copy film are removed from compartments 14 and 16, are sandwiched in emulsion-to-emulsion contact with the original on top and are fed into exposure entrance 40 (as seen in FIG. 1). The sandwich is carred by belt 36 along the path indicated by arrows 42 in FIG. 2 through an exposure station including an exposure cylinder 44, then out into exposed film tray 46.

The exposed copy film is separated from the original and is inserted into developer entrance 48 (as seen in FIG. 1). The copy film follows the path indicated by arrows 50 in FIG. 2 through a development station including a heat development cylinder 52, then out to developed film tray 54. Belt 36 passes along a cooling drum 56 after the heat development station to return the belt to approximately room temperature.

Figure 3:
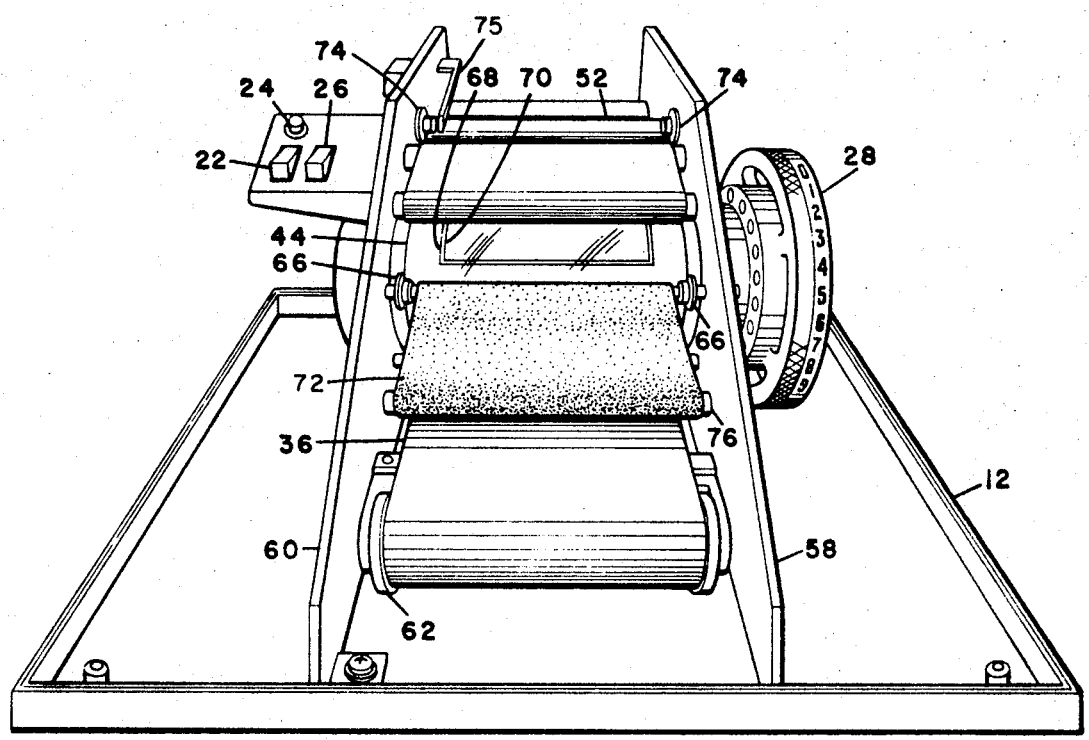
FIG. 3 is a perspective view of the duplicator with cover removed.

The arrangement of the belt and guide means is further shown in FIG. 3. The various rollers carrying belt 36, the exposure cylinder 44, the heat development cylinder 55, etc., are journaled on two main side walls 58 and 60 which are secured to base 12. The frontmost guide roller 62 is mounted on a retractable adjustment assembly, generally designated 64, shown in detail in FIGS. 4–6.

Various drive components, such as a drive motor to drive belt 36, a blower to direct cool air through cooling drum 56, a transformer to supply power to the heater and exposure lamp, etc., would be mounted on base 12 beside or behind side walls 58 and 60. These conventional components are not shown for drawing simplicity and clarity.

Exposure cylinder 44 is mounted on a plurality of flanged wheels 66 which permit the cylinder to be rotated by belt 36. Within cylinder 44, which is transparent to ultraviolet light are a pair of telescoping cylindrical metal sleeves having matching openings 68 and 70 in their walls. Wheel 28 is rotatable to rotate one of these sleeves to vary the overlap of openings 68 and 70. The exposure of film passing the openings on belt 36 to ultraviolet light from a lamp (not shown) within the sleeves depends upon the degree of overlap. Thus, film exposure is varied by moving wheel 28.

Since dust which may enter with the original film/copy film sandwich may deposit on exposure cylinder 44 and degrade image quality, a lint collecting belt 72 is positioned in contact with the surface of cylinder 44. Belt 72 is mounted on three rollers 74, 76 and 78. Since belt 72 does not move as cylinder 44 rotates, the contacting portion of belt 72 continually "wipes" the cylinder surface. When the dust collecting capacity of the contacting portion is reached, belt 72 is moved slightly to bring a clean portion of the belt into contact with cylinder 44. Eventually, belt 72 is replaced with a clean belt. Preferably, belt 72 has a soft, high-nap surface, such as velvet.

The latent vesicular film image is made visible by heating the film while in contact with heat development cylinder 52. Cylinder 52 preferably comprises a thin wall aluminum cylinder having a thin silicone rubber coating over most of its outer surface. In the past, problems of film adhering to heat development surfaces have often been encountered. Surprisingly, it has been found that lightly grinding or abrading a silicone rubber surface will substantially eliminate these adhesion problems. Preferably, a circumferential strip having a width of about ¼ inch is left uncoated at each end of cylinder 52 to provide a hard contact surface for flanged wheels 79 which support cylinder 52 for rotation with belt 36.

Cylinder 52 is heated by radiation from a small diameter cylindrical infrared lamp (not shown) located within and along the axis of cylinder 52. This lamp, which preferably comprises a tungsten filament sealed within a slender quartz tube, is attached to sidewalls 58 and 60 and does not rotate with cylinder 52, thus eliminating slip-rings and the attendant complexity. Cylinder 52 can be heated to operating temperature very rapidly when power is applied, since both the tungsten filament and the thin wall of cylinder 52 have low thermal inertia. The wall of cylinder 52 is preferably less than about 0.06 inch thick to minimize warm up time.

The temperature of the outer surface of cylinder 52 is measured and regulated by a thermister sensor 75 which is lightly spring pressed against cylinder 52. Preferably, the area of thermister 75 which is in contact with cylinder 52 has a low friction surface, such as a flurocarbon resin. This arrangement is preferred because thermister 75 does not rotate, eliminating electrical slip rings which otherwise would be required to connect thermister 75 to the conventional temperature control circuits (not shown).

Belt 36 may be made from any suitable low-stretch, heat resistant material. Preferably, the belt consists of a silicone coated fabric. As discussed below, proper tracking of belt 36 over the unflanged guide rollers is assured by adjusting guide roller 62.

Details of the adjustment means 64 are shown in FIGS. 4–7. This assembly includes a belt guiding roller 62 mounted on an axle 82 which is secured to support yoke 84. Roller 62 is preferably mounted on ball bearings (not shown) for rotation relative to axle 82.

Figure 6:
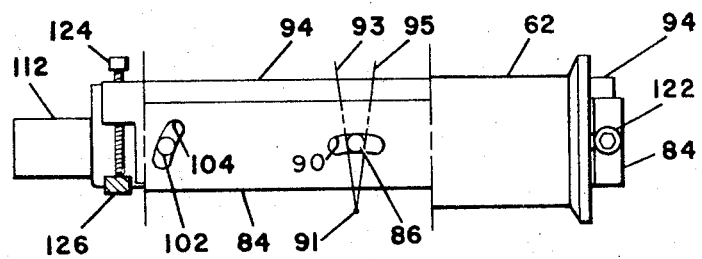
FIG. 6 is sectional view taken on line 6:6 in FIG. 4.

A narrow end 86 of main support shaft 88 extends through an arcuate slot 90 (as seen in FIG. 6) in the center portion of yoke 84. A retaining ring assembly 92 (shown only in FIG. 4) holds yoke 84 in place. Slot 90 prevents vertical relative movement between yoke 84 and shaft 88, while permitting slight relative movement in an arcuate direction during roller adjustment, as further discussed below.

Shaft 88 is secured to end block 94 which is positioned immediately adjacent to yoke 84. Shaft 88 passes through openings in end walls 96 and 98 of tray 100. Shaft 88 is a sliding fit in these end wall openings. Preferably, a collar (not shown) of low friction material is included around each opening, in sliding contact with shaft 88.

To prevent rotation of the assembly of shaft 88 and end block 94 relative to tray 100, a guide pin 102 is secured to end block 94 and projects through an arcuate slot 104 in yoke 84 and an opening in end wall 96 of tray 100. Slot 104 permits relative arcuate movement of yoke 84 relative to pin 102 during roller adjustment, while preventing relative transverse movement. Slots 90 and 104 are both arcuate in shape, with the center of both lying in the plane of the lower edge of roller 62, as schematically indicated by point 91 in FIG. 6. As further detailed below, this permits roller 62 to pivot about point 91 during belt tracking adjustment.

Figure 4:
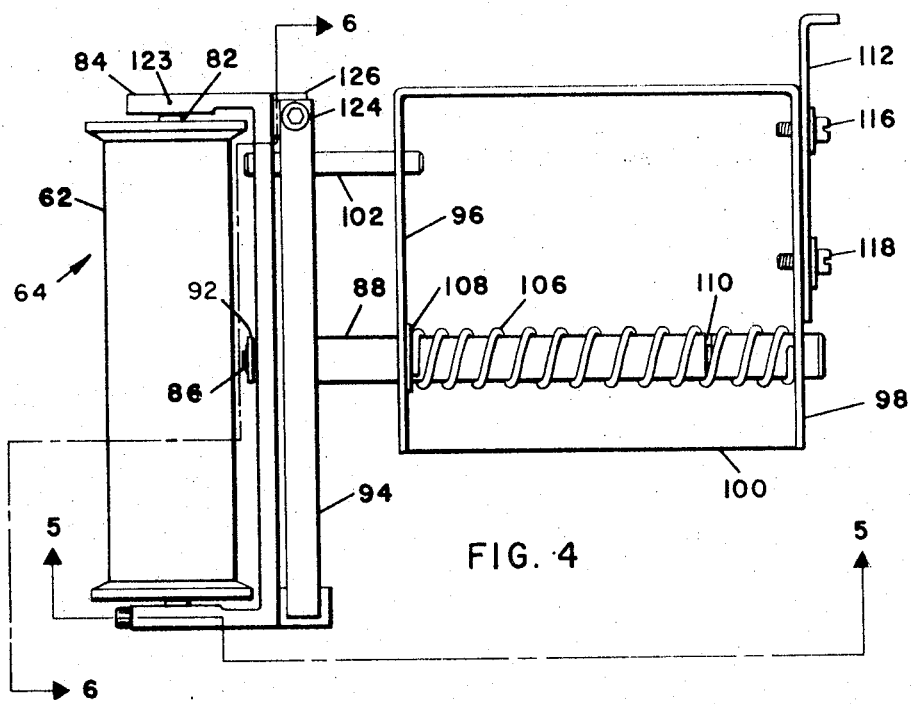
FIG. 4 is a plan view of the film carrying belt tracking adjustment means.
Figure 5:
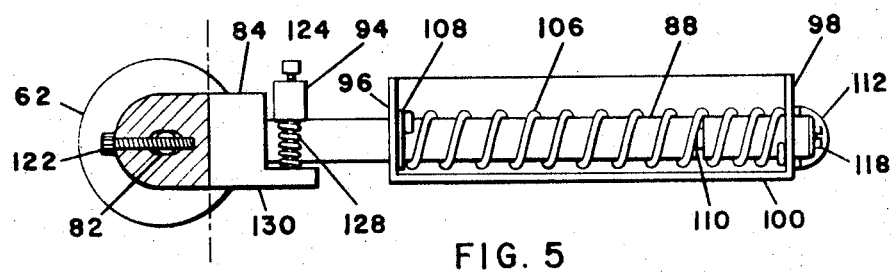
FIG. 5 is an elevation view showing the right side of the adjustment means partly in section taken on line 5:5 of FIG. 4.
Figure 7:
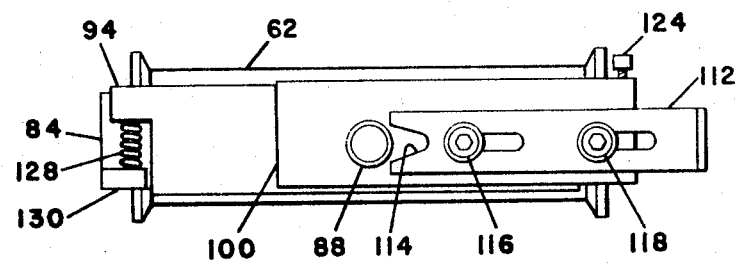
FIG. 7 is an elevation view of the latch mechanism, taken from the right side of FIG. 4.

A compression spring 106 surrounds shaft 88 within tray 100, bearing against end wall 98 and against a retaining ring 108 set in a slot in shaft 88. Thus, spring 106 urges shaft 88 leftwardly to the position shown in FIGS. 4 and 5, until retaining ring 108 abuts end wall 96. If roller 62 is pushed back toward tray 100, spring 106 is compressed as ring 108 is forced away from wall 96. As end block 94 approaches end wall 96, slot 110 moves into latching position adjacent locking slide 112. Slide 112 is moved toward shaft 88 (as best seen in FIG. 7) until the V-shaped notch 114 in the end of slide 112 enters slot 110. Roller 62, when released, will be held in the retracted position. A pair of cap screws 116 and 118, with associated washers, support slide 112 for movement as described. Latching roller 62 in this retracted position permits belt 36 (as seen in FIG. 2) to be easily changed, since it will be in a slack condition. A new belt is inserted, then slide 112 is moved to release shaft 88. In use, with a belt in place, the belt should prevent roller from entirely returning to the position shown in FIGS. 4 and 5, so that retaining ring 108 will be spaced from end wall 96. Thus, spring 106 will continue to urge the roller assembly to the left, as seen in FIGS. 4 and 5, to maintain a constant desired tension on belt 36.

The major influence on tracking with wide belts is the angle at which the belt approaches the roller. A belt led over a roller at various angles will move toward a point at which the approach angle is 90°. Adjustment of screw 122 moves axle 82, so that roller 62 pivots about a point schematically indicated at 123 in FIG. 4 where axle 82 engages the opposite side of yoke 84. This serves to orient roller 62 at right angles to the incoming belt, to assure central tracking over roller 62. However, if screw 122 is used alone to compensate for dimensional errors and manufacturing tolerances in the mounting of other rollers in the system, roller 62 would probably have to be skewed slightly to bring the belt back to the desired path after deviations caused by slight misalignment of other rollers. This skewing of roller 62 would result in unequal tension across the belt. It has been found, however, that proper tracking and even lateral belt tension can be achieved by adding a second roller arc adjustment which pivots the roller in a plane perpendicular to the plane of the first adjustment.

An adjustment screw 124 in end block 94 bears on flange 126 extending back from yoke 84. Extension of screw 124 moves flange 126 downwardly (as seen in FIG. 4), causing yoke 84 and roller 80 to pivot about schematically illustrated point 91, due to the shape of arcuate slots 90 and 104, which rotatably connects end block 94 and yoke 84. The force of screw 124 against flange 126 is balanced by a compression spring 128 positioned between flange 130 and end block 94 at the end of end block 94 opposite to screw 124. A typical adjustment range is schematically illustrated by the arc between lines 93 and 95 in FIG. 6.

Adjustment of screw 124 controls the lateral belt movement as it exits the roller without affecting the incoming position because of the location of pivot 91. Pivot 91 is equal to a point touching the bottom center of roller 62. The roller adjustment does not affect lateral movement of the belt 36 at the entrance to roller 62, there is a slight lateral belt shift coming back to roller 62 after the belt goes through the system of rollers due to adjustment of screw 124. Adjustment of the two screws 122 and 124 compensates for system errors while maintaining equal tension across the belt.

While specific arrangements and locations of components have been described in the above description of a preferred embodiment, these may be varied where suitable within the scope of this invention. For example, the locations of screw 124 and spring 128 could be reversed, if desired.

Other variations, applications and ramifications of the invention will occur to those skilled in the art upon reading this disclosure. These are intended to be included within the scope of the invention, as defined in the appended claims.

We claim:

1. A duplicator for individual microfiche which comprises:
    a housing;
    a first entrance in said housing adapted to receive a sandwich made up of an individual original microfiche and a sheet of copy film;
    an exposure station within said housing adapted to expose said copy film to actinic radiation through said original film to form a latent image in said copy film corresponding to said original film as said sandwich is transported therethrough.
    an exposed film tray at least partially outside of said housing for receiving said sandwich from said exposure station;
    a second entrance in said housing for receiving a sheet of exposed copy film;
    a development station within said housing adapted to develop a visible image on said exposed copy film corresponding to said latent image as said copy film is transported therethrough;
    a developed film tray at least partially outside of said housing for receiving said copy film from said development station; and
    a single endless belt transport means adapted to transport said sandwich from said first opening, through said exposure station to said exposed film tray and to transport said copy film from said second opening through said development station to said developed film tray,
    said single endless belt transport means comprising a plurality of rollers and a wide belt entrained over said plurality of rollers, one of said rollers being adjustable and including roller adjustment means to maintain belt tracking and tension;
    said roller adjustment means comprising
    a. a first adjustment means for moving one end of said adjustable roller in a plane containing the axis of said roller and substantially parallel to the plane of the belt as it comes in to the adjustable roller, said adjustable roller pivotable by said first adjustment means about a point lying at the end of said adjustable roller opposite to the movable end;
    b. a second adjustment means for pivoting said adjustable roller in a plane containing the axis of said roller and substantially perpendicular to the plane of said first adjustment, said second adjustment means pivoting said adjustable roller about a point lying substantially in the plane of the incoming belt adjacent to the center of the adjustable roller; and
    c. tensioning means urging said adjustable roller toward the belt to maintain the belt in tension,
    said adjustable roller located immediately adjacent to said first opening and engaging the belt over substantially one-half of the roller circumference.

2. The duplicator according to claim 1 wherein said exposure station comprises a source of ultraviolet radiation within an ultraviolet-transparent exposure cylinder which is rotatable by said belt and sandwich moving through the exposure station, and means to selectively vary the quantity of ultraviolet radiation reaching said sandwich.

3. The duplicator according to claim 2 further including a movable cleaning belt in contact with a portion of the surface of said exposure cylinder whereby solid particles are wiped from the surface as said exposure cylinder is rotated, and means permitting fresh portions of said cleaning belt to be brought into contact with said exposure cylinder surface.

4. The duplicator according to claim 1 wherein said development station includes a heated cylinder and means to bring said copy film into contact with said heated cylinder as said copy film is transported through said development station.

5. The duplicator according to claim 1 further including an air cooled drum means adapted to contact said belt to cool said belt after said belt leaves said developed film tray and before said belt reaches said first opening.

* * * * *